(12) United States Patent
Nakane et al.

(10) Patent No.: US 12,482,502 B2
(45) Date of Patent: Nov. 25, 2025

(54) SPINDLE MOTOR HAVING BLIND HOLE CONFIGURATION DETAIL AND HARD DISK DRIVE DEVICE HAVING THE SAME

(71) Applicant: MINEBEA MITSUMI Inc., Nagano (JP)

(72) Inventors: Junichi Nakane, Kitasaku-gun (JP); Hideaki Showa, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 217 days.

(21) Appl. No.: 18/456,705

(22) Filed: Aug. 28, 2023

(65) Prior Publication Data

US 2024/0087614 A1 Mar. 14, 2024

(30) Foreign Application Priority Data

Sep. 9, 2022 (JP) .................................. 2022-144006

(51) Int. Cl.
| G11B 33/02 | (2006.01) |
| G11B 19/20 | (2006.01) |
| G11B 25/04 | (2006.01) |
| G11B 33/12 | (2006.01) |

(52) U.S. Cl.
CPC ........ *G11B 33/022* (2013.01); *G11B 19/2009* (2013.01); *G11B 25/043* (2013.01); *G11B 33/123* (2013.01)

(58) Field of Classification Search
None
See application file for complete search history.

(56) References Cited

U.S. PATENT DOCUMENTS

| 6,128,159 | A  | * | 10/2000 | Ino ....................... | G11B 25/043 |
| | | | | | 360/97.16 |
| 7,085,108 | B1 | * | 8/2006 | Oveyssi et al. ...... | G11B 5/4813 |
| | | | | | 360/99.15 |
| 9,330,728 | B1 | | 5/2016 | Nakamura et al. | |
| 9,336,817 | B1 | | 5/2016 | Hirasawa | |
| 2001/0015869 | A1 | * | 8/2001 | Kamezawa et al. . | G11B 25/043 |
| | | | | | 360/97.21 |
| 2013/0222947 | A1 | * | 8/2013 | Sugii et al. .......... | G11B 25/043 |
| | | | | | 360/99.08 |
| 2023/0335156 | A1 | * | 10/2023 | Ohnuma .............. | G11B 25/043 |
| 2024/0087615 | A1 | * | 3/2024 | Miyata et al. ....... | G11B 25/043 |

FOREIGN PATENT DOCUMENTS

| JP | 2016-170843 A | 9/2016 |
| JP | 2016-171717 A | 9/2016 |

* cited by examiner

*Primary Examiner* — Craig A. Renner
(74) *Attorney, Agent, or Firm* — Chrisman Gallo Tochtrop LLC

(57) ABSTRACT

A spindle motor includes a base being a cast product as a part of a housing of a hard disk drive device. The base has a hole portion configured to accommodate a fastening member configured to fasten a member to be attached to the base. The hole portion is a blind hole extending in a depth direction from a surface of the base and having a tip surface formed flat.

6 Claims, 12 Drawing Sheets

- PRIOR ART - ions # SPINDLE MOTOR HAVING BLIND HOLE CONFIGURATION DETAIL AND HARD DISK DRIVE DEVICE HAVING THE SAME

CROSS-REFERENCE TO RELATED APPLICATIONS

This application claims the benefit of priority to Japanese Patent Application Number 2022-144006 filed on Sep. 9, 2022. The entire contents of the above-identified application are hereby incorporated by reference.

TECHNICAL FIELD

The disclosure relates to a spindle motor and a hard disk drive device.

BACKGROUND

A base portion constituting a part of a housing of a hard disk drive device is generally manufactured by die casting aluminum (for example, JP 2016-170843 A and JP 2016-171717 A).

SUMMARY

In the base portion manufactured by die casting, a casting cavity is sometimes formed. When machining, such as cutting, is performed on the base portion, the casting cavity sometimes become exposed at a surface of the base portion. As a result, an interior space and an exterior space of the housing communicate via the casting cavity. "To communicate" means that a space and a space communicate via a passage.

When a hard disk drive device is assembled using the base portion, foreign matter, such as corrosive gas or contaminant particles, might possibly enter from the exterior space to the interior space of the housing through the casting cavity. Also, when the interior space of the housing is filled with a gas (for example, helium) having a density lower than a density of air, the gas might possibly leak to the exterior space through the casting cavity.

For example, JP 2016-170843 A discloses a technique of providing a recess part between a metal surface of a base portion and a screw hole to block a casting cavity by the recess part and prevent leakage of a gas filling the inside.

Also, J P 2016-171717 A discloses a technique of forming a screw hole in a screw attachment member as a member separate from a base portion to block a casting cavity at a boundary between the base portion and the screw attachment member and prevent leakage of a gas filling the inside.

However, in the techniques described in JP 2016-170843 A and JP 2016-171717 A, for example, when a defect, such as a crack, occurs at a surface of the base portion or when a surface of the base portion is machined, the gas filling the inside might possibly leak to the outside through the above-described recess part or the above-described boundary.

The disclosure has been made in view of the above-described problem, and an object of the disclosure is to provide a technique for avoiding an interior space and an exterior space of a housing communicating via a casting cavity.

In order to achieve the above-described object, a spindle motor according to the disclosure is a spindle motor for use in a hard disk drive device. The spindle motor includes a base being a cast product as a part of a housing of the hard disk drive device. The base includes a hole portion configured to accommodate a fastening member configured to fasten a member to be attached to the base, and the hole portion is a blind hole extending in a depth direction from a surface of the base and having a tip surface formed flat.

According to the spindle motor of the disclosure, communication between the interior space and the exterior space of the housing via a casting cavity can be avoided.

BRIEF DESCRIPTION OF DRAWINGS

FIG. 5A illustrates a step of forming a pilot hole, and FIG. 5B illustrates a step of forming a female screw at a body wall surface of the pilot hole.

FIG. 6A illustrates a step of forming a pilot hole, FIG. 6B illustrates a step of cutting a tip corner surface of the pilot hole, and FIG. 6C illustrates a step of forming a female screw at a body wall surface of the pilot hole.

DESCRIPTION OF EMBODIMENTS

An embodiment of the disclosure is described below with reference to the drawings.

Figure 1:
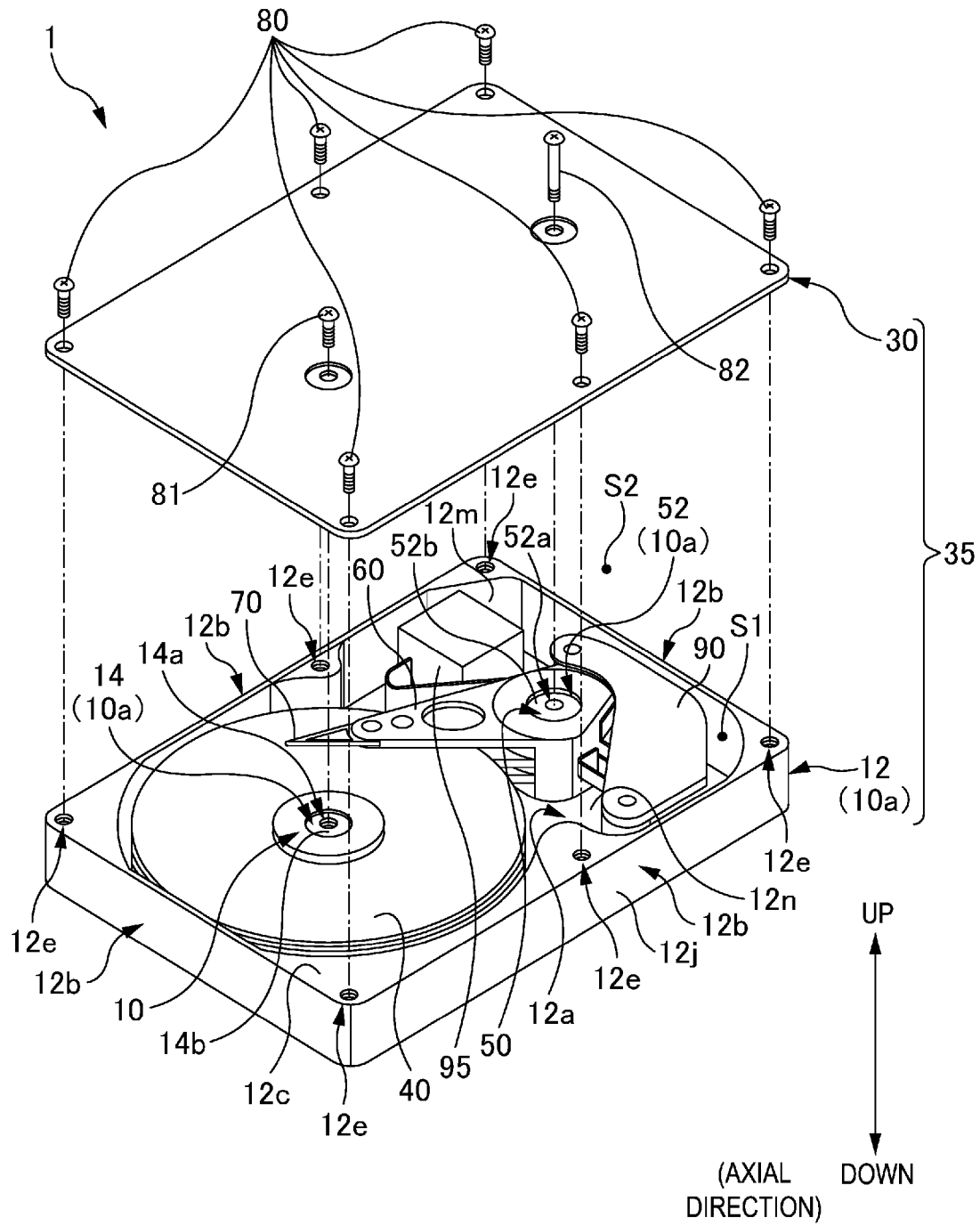
FIG. 1 is a perspective view illustrating an example of a hard disk drive device according to the present embodiment.
Figure 2:
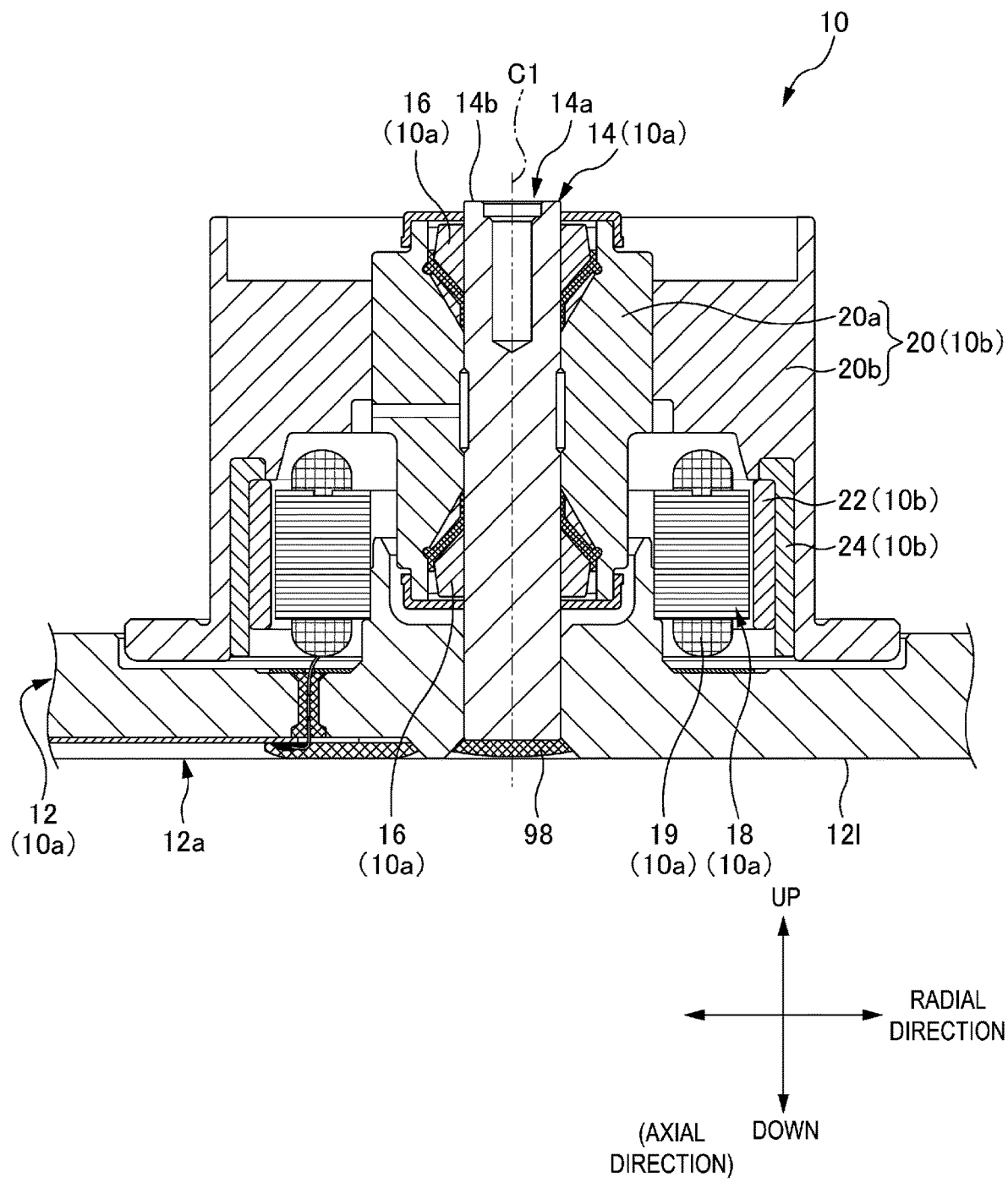
FIG. 2 is a partial cross-sectional view illustrating an example of a spindle motor used for the hard disk drive device of FIG. 1.
Figure 3:
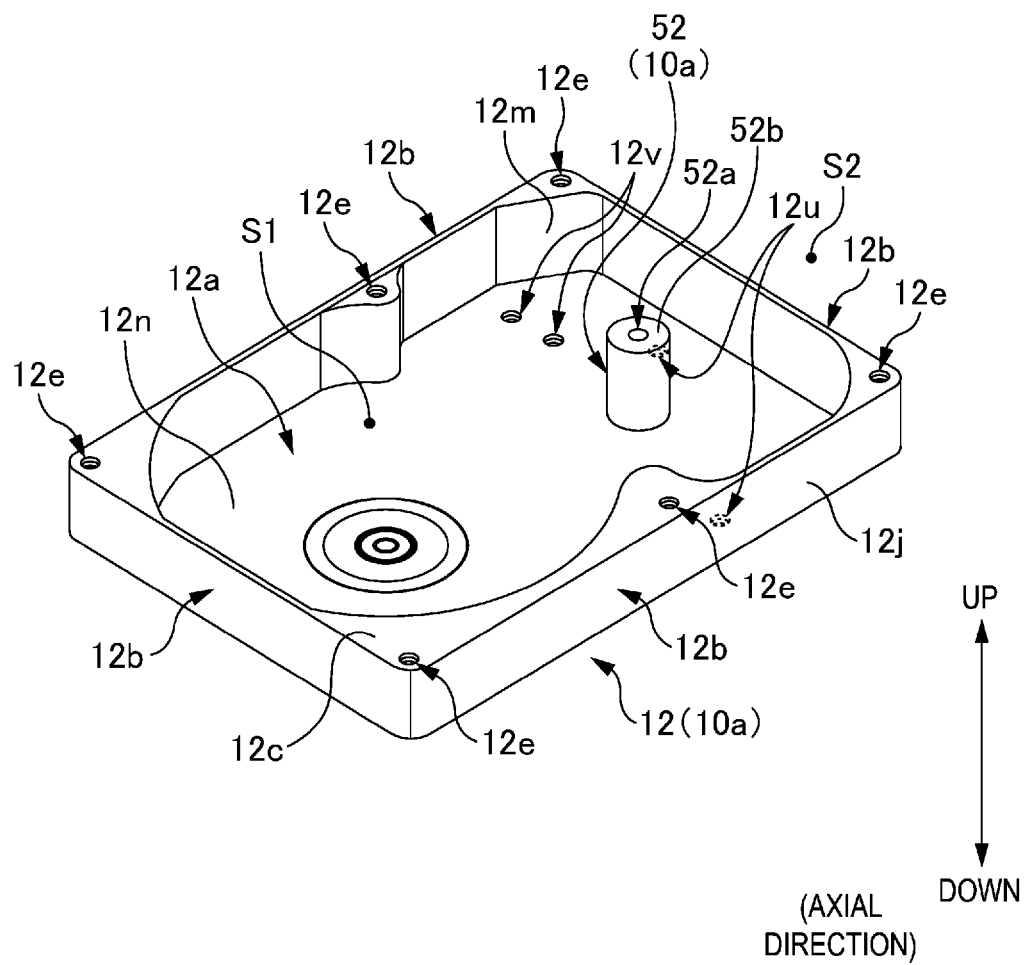
FIG. 3 is a perspective view illustrating an example of a base of the spindle motor of FIG. 2.
Figure 4:
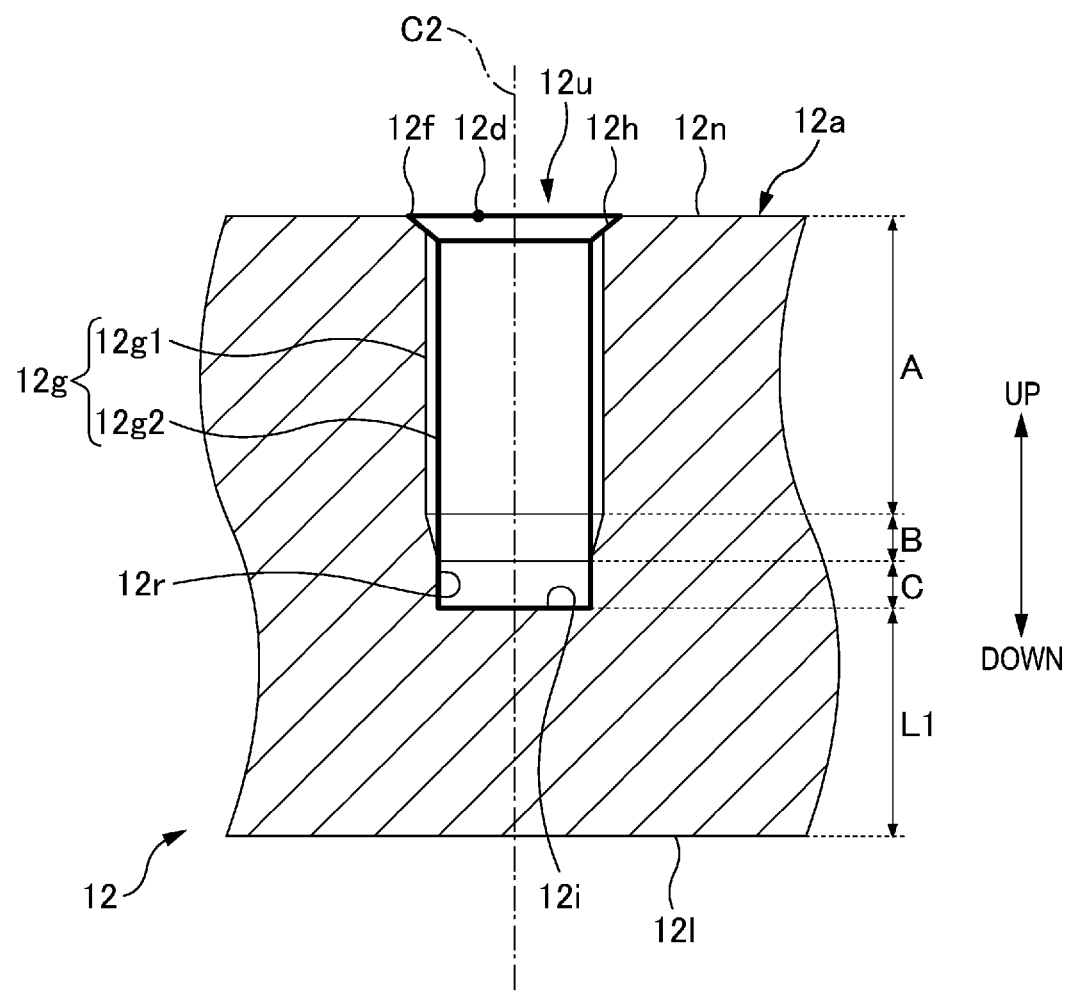
FIG. 4 is a cross-sectional view illustrating an example of a screw hole formed in the base of FIG. 3.

FIG. 1 is a perspective view illustrating an example of a hard disk drive device 1 according to the present embodiment. FIG. 2 is a cross-sectional view illustrating an example of a spindle motor 10 used for the hard disk drive device 1 of FIG. 1. FIG. 3 is a perspective view illustrating an example of a base 12 of the spindle motor 10 of FIG. 2. FIG. 4 is a cross-sectional view illustrating an example of a screw hole (hole portion) 12u formed in the base 12 of FIG. 3.

Hard Disk Drive Device 1

As illustrated in FIG. 1, the hard disk drive device 1 includes the spindle motor 10, a cover (member to be attached) 30, recording disks 40, a bearing device 50, swing arms 60, magnetic heads 70, male screws (fastening members) 80, a voice coil motor (member to be attached) 90, and a connector (member to be attached) 95.

The cover 30 is a plate-like member closing an open surface of the base 12 described later. The cover 30 is fastened to the base 12 using the male screws 80. Sealing means (not illustrated) is provided between the cover 30 and the base 12, and thus the cover 30, together with the base 12, forms a housing 35 having a hermetically sealed interior space S1. In FIG. 1, the reference sign S2 indicates an exterior space of the housing 35.

The interior space S1 of the housing 35 is filled with helium gas as a gas having a density lower than the density of air. The interior space S1 may be filled with, for example, nitrogen gas or a mixed gas of helium and nitrogen. The interior space S1 can contain another gas having a density lower than the density of air. The low density gas need not be contained in the interior space S1, that is, air may be contained. The spindle motor 10, the recording disks 40, the bearing device 50, the swing arms 60, the magnetic heads 70, the voice coil motor 90, and the connector 95 are accommodated in the interior space S1 of the housing 35.

A plurality of the recording disks 40 are supported by a rotor 20 of a rotating portion 10b of the spindle motor 10 described later, and thus respective disk surfaces are opposed. Clearances are formed between the respective recording disks 40. In the present embodiment, at least seven of the recording disks 40 are provided with predetermined gaps in an axial direction of a shaft 14 described later.

The bearing device 50 is attached to a columnar support 52 disposed at the base 12, and swingably supports a plurality of the swing arms 60 disposed at the clearances between the respective recording disks 40. A magnetic head 70 is disposed at a tip portion of the swing arm 60. The magnetic head 70 is a member for imparting magnetism to the recording disk 40 and reading magnetism from the recording disk 40. The voice coil motor 90 is electrically connected to a printed circuit board (not illustrated) via the connector 95. The voice coil motor 90 supplies a driving force to the swing arms 60. Accordingly, the magnetic heads 70 are positioned with respect to the recording disks 40. The voice coil motor 90 and the connector 95 are fastened to the base 12 by male screws (not illustrated).

When the rotor 20 of the spindle motor 10 rotates, the recording disks 40 also rotate. In the state, when the swing arms 60 swing, the magnetic heads 70 move over the rotating recording disks 40. The magnetic heads 70 impart magnetism to the recording disks 40 and read magnetism from the recording disks 40. Thus, the magnetic heads 70 perform recording of data on the recording disks 40 and reading of data recorded on the recording disks 40.

Spindle Motor 10

The spindle motor 10 is used for the hard disk drive device 1. The spindle motor 10 includes a stationary portion 10a and the rotating portion 10b configured to rotate with respect to the stationary portion 10a. As illustrated in FIGS. 1 and 2, the stationary portion 10a includes the base 12, the shaft 14, the bearing members 16, a stator core 18, a coil 19, and the columnar support 52. The rotating portion 10b includes the rotor 20, a ring magnet 22, and a yoke 24.

As illustrated in FIG. 2, a direction parallel to a center axis line C1 of the shaft 14 is defined as an axial direction, and a direction perpendicular to the axial direction is defined as a radial direction. A direction around the center axis line C1 of the shaft 14 is defined as a circumferential direction (not illustrated). For convenience of description, the axial direction is defined as a perpendicular direction, and with respect to the shaft 14, a side of the rotor 20 is defined as an upper side, and a side of the base 12 is defined as a lower side.

The base 12 is a portion as a part of the housing 35 of the hard disk drive device 1, and is a cast product. As illustrated in FIGS. 1 and 3, the base 12 has a box-like shape with a bottom of a substantially rectangular parallelepiped having an open upper surface, and is manufactured by die casting a metal, such as aluminum. The base 12 has a bottom portion 12a disposed at a lower side, and the bottom portion 12a has a rectangular plate shape having short sides and long sides. The bottom portion 12a may have a square plate shape with four sides having the same length. The bottom portion 12a has a bottom upper surface 12n facing upward and a bottom lower surface 12l facing downward.

A side wall portion 12b extending in a direction orthogonal (that is upward) to the bottom portion 12a is formed around an entire periphery of the bottom portion 12a. The side wall portion 12b may extend upwardly from the bottom upper surface 12n of the bottom portion 12a. The side wall portion 12b includes a side wall upper surface 12c facing upward, a side wall outer surface 12j extending downward from an outer edge of the side wall upper surface 12c and facing the exterior space S2, and a side wall inner surface 12m extending downward from an inner edge of the side wall upper surface 12c and facing the interior space S1. A space defined by the bottom upper surface 12n, the side wall inner surface 12m, and a lower surface (not illustrated) of the cover 30 is the interior space S1. In the present embodiment, the base 12 has first surfaces at the housing exterior side and second surfaces at the housing interior side. That is, the surfaces of the base 12 are divided into the first surfaces at the housing exterior side and the second surfaces at the housing interior side. The second surfaces at the housing interior side refer to the surfaces of the base 12 defining the interior space S1, that is, the bottom upper surface 12n and the side wall inner surface 12m. Further, the first surfaces at the housing exterior side refer to the surfaces of the base 12 not defining the interior space S1, that is, the side wall upper surface 12c, the side wall outer surface 12j, and the bottom lower surface 12l.

As illustrated in FIG. 3, the base 12 has the screw holes (hole portions) 12u in the bottom upper surface 12n, and the screw holes 12u accommodate male screws (not illustrated) for fastening the voice coil motor 90 to the base 12. As illustrated in FIG. 4, the screw hole 12u is a blind hole extending downward (depth direction) from the bottom upper surface 12n and having a tip surface 12i at a lower side formed flat.

Specifically, as illustrated in FIG. 4, the screw hole 12u has an opening edge 12f bordering an opening portion 12d opened at the bottom upper surface 12n, a tapered surface 12h obliquely extending inward and downward from the opening edge 12f, an inner wall surface 12g extending downward from a lower end of the tapered surface 12h, an inner wall end portion surface 12r extending further downward from a lower end of the inner wall surface 12g, and the tip surface 12i closing a lower end of the inner wall end portion surface 12r and is formed flat. The tip surface 12i is a surface facing upward.

The opening portion 12d is defined by the opening edge 12f having an annular shape around the center axis line C2. The tapered surface 12h, the inner wall surface 12g, and the inner wall end portion surface 12r are formed annularly around the center axis line C2. The screw hole 12u accommodates the male screw 80 in a space defined by the tapered surface 12h, the inner wall surface 12g, the inner wall end portion surface 12r, and the tip surface 12i. On the inner wall surface 12g, a thread ridge portion 12g2 and a thread valley portion 12g1 are formed as a female screw to be screwed with a male screw. "To screw" means to fit screws together. In the present embodiment, the shortest distance L1 (see FIG. 4) between the tip surface 12i of the screw hole 12u and the bottom lower surface 12l of the base 12 facing the tip surface 12i is from 0.5 mm to 2.0 mm. "To face" means that respective surfaces face mutually opposite directions.

As illustrated in FIG. 4, the screw hole 12u has a pilot hole depth D (FIG. 5A) obtained by adding an effective screw length A, an incomplete screw length B, and a margin length C in a downward direction from the bottom upper surface 12n. The effective screw length A is a dimension value from the bottom upper surface 12n to the lower ends of the thread ridge portion 12g2 and the thread valley portion 12g1 formed at the inner wall surface 12g. The incomplete screw length B is a dimension value of a portion having an incomplete mountain shape formed by a chamfered portion, a biting portion, or the like of a machining (screw machining) tool described later. That is, the portion of the screw hole 12u corresponding to the incomplete screw length B does not become screwed with the male screw. The margin length C is a dimension value of the inner wall end portion surface 12r for preventing bottom contact of the screw machining tool described later, and is, for example, a dimension value corresponding to approximately less than 0.5 pitches of the effective screw length A. The dimension value of the inner wall end portion surface 12r is preferably 0.2 mm or more.

While FIG. 4 illustrates an example of the screw hole 12u extending downward from the bottom upper surface 12n, the screw hole formed in the base 12 may extend in a depth direction from any of the surfaces of the base 12, that is, any of the first surfaces at the housing exterior side and the second surfaces at the housing interior side.

For example, screw holes 12v illustrated in FIG. 3 may also be blind holes extending downward from the bottom upper surface 12n. In the case, the shortest distance between the tip surface of the screw hole 12v and the bottom lower surface 12l of the base 12 facing the tip surface is from 0.5 mm to 2.0 mm. Then, a male screw is screwed with a female screw of the screw hole 12v to fasten the connector 95 as a member to be attached to the base 12.

Further, screw holes 12e illustrated in FIG. 3 may extend downward from the side wall upper surface 12c. In the case, the shortest distance between the tip surface of the screw hole 12e and the bottom lower surface 12l of the base 12 facing the tip surface is from 0.5 mm to 2.0 mm. In the case, the male screw 80 is screwed with a female screw of the screw hole 12e to fasten the cover 30 as a member to be attached to the base 12.

Additionally, another screw hole (not illustrated) may extend in a depth direction from the side wall outer surface 12j toward the side wall inner surface 12m. In the case, the shortest distance between the tip surface of the screw hole and the side wall inner surface 12m of the base 12 facing the tip surface is from 0.5 mm to 2.0 mm. In the case, a male screw is screwed with a female screw of the screw hole to fasten an electronic device or the like as a member to be attached to the base 12.

Further, another screw hole (not illustrated) may extend upward (depth direction) from the bottom lower surface 12l. In the case, the shortest distance between the tip surface of the screw hole and the side wall upper surface 12c or the bottom upper surface 12n of the base 12 facing the tip surface is from 0.5 mm to 2.0 mm. For example, a male screw is screwed with a female screw of a screw hole formed in the bottom lower surface 12l to fasten a printed board (not illustrated) as a member to be attached to the base 12.

The shaft 14 is a component made of metal having a cylindrical shape and is fixed to the base 12 by press fitting or the like as illustrated in FIG. 2. Further, fixing means, such as an adhesive 98, is applied to a lower end of the shaft 14. Accordingly, the shaft 14 is hermetically fixed to the base 12 and a sealing property of the housing 35 is improved. An upper side end portion of the shaft 14 has a screw hole 14a. The screw hole 14a extends downward from a shaft upper surface 14b and accommodates a male screw 81 (FIG. 1). By the male screw 81 being screwed with a female screw formed in the screw hole 14a, the cover 30 is fastened to the shaft 14.

The columnar support 52 (FIGS. 1 and 3) attached with the bearing device 50 is also fixed to the base 12 by press fitting or the like. FIG. 3 illustrates the columnar support 52 in a state of being fixed to the base 12 by press fitting or the like. The columnar support 52 is a component made of metal having a cylindrical shape extending upward from the bottom portion 12a of the base 12. An upper side end portion of the columnar support 52 has a screw hole 52a (FIG. 1). The screw hole 52a extends downward from a columnar support upper surface 52b and accommodates a male screw 82. By the male screw 82 being screwed with a female screw formed in the screw hole 52a, the cover 30 is fastened to the columnar support 52.

The stator core 18 is fixed to the base 12. The stator core 18 is formed by laminating a plurality of soft magnetic materials (for example, electromagnetic steel plates) having a thin plate shape in the axial direction, has an annular shape, and includes a plurality of pole teeth protruding at an outer side in the radial direction. The plurality of pole teeth are provided at equal gaps along the circumferential direction, and the coil 19 is wound around each of the pole teeth.

A pair of bearing members 16 having a conical shape are fixed to an outer peripheral surface of the shaft 14, and the rotor 20 is rotatably supported at the pair of bearing members 16. The rotor 20 has a sleeve 20a and a hub 20b. The shaft 14 is inserted into the sleeve 20a, and the sleeve 20a is opposed to the shaft 14 and the pair of bearing members 16 with minute clearances. The minute clearances between the sleeve 20a and the pair of bearing members 16 are filled with lubricant (not illustrated) to form so-called fluid dynamic bearings. The hub 20b is fixed at an outer side in the radial direction of the sleeve 20a. The plurality of recording disks 40 are installed at an outer side in the radial direction of the hub 20b (see FIG. 1).

The ring magnet 22 and the yoke 24 are disposed at an inner peripheral surface of the hub 20b. The yoke 24 is a tubular member for suppressing leakage of magnetic flux from the ring magnet 22. The yoke 24 is attached to the inner peripheral surface of the hub 20b over the entire periphery in the circumferential direction. The ring magnet 22 is a tubular member being magnetized such that adjacent portions alternately have opposite polarities, such as SNSN, along the circumferential direction. The ring magnet 22 is attached across the entire periphery of an inner peripheral surface of the yoke 24. An inner peripheral surface of the ring magnet 22 opposes an outer peripheral surface of the pole teeth of the stator core 18 with a clearance. By causing a drive current to flow through the coil 19, a magnetic flux is generated in the stator core 18. Accordingly, the rotor 20 rotates with respect to the shaft 14 and the stator core 18.

Manufacturing Method of Spindle Motor

Figure 5A:
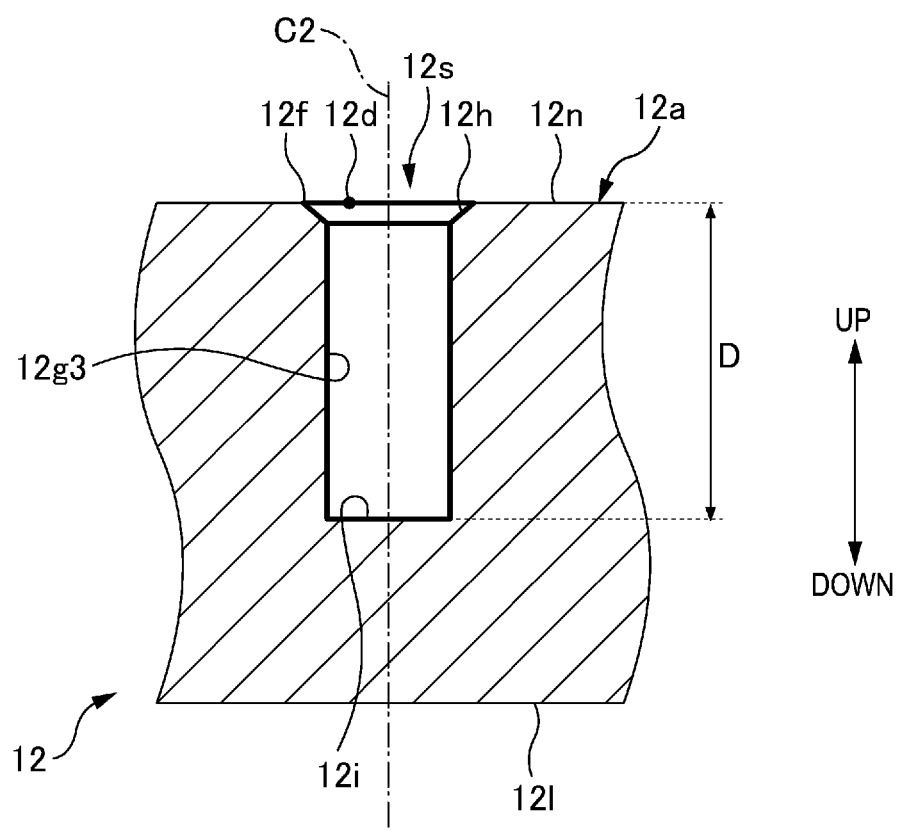
FIGS. 5A and 5B are views illustrating an example of a manufacturing method of the screw hole.
Figure 5B:
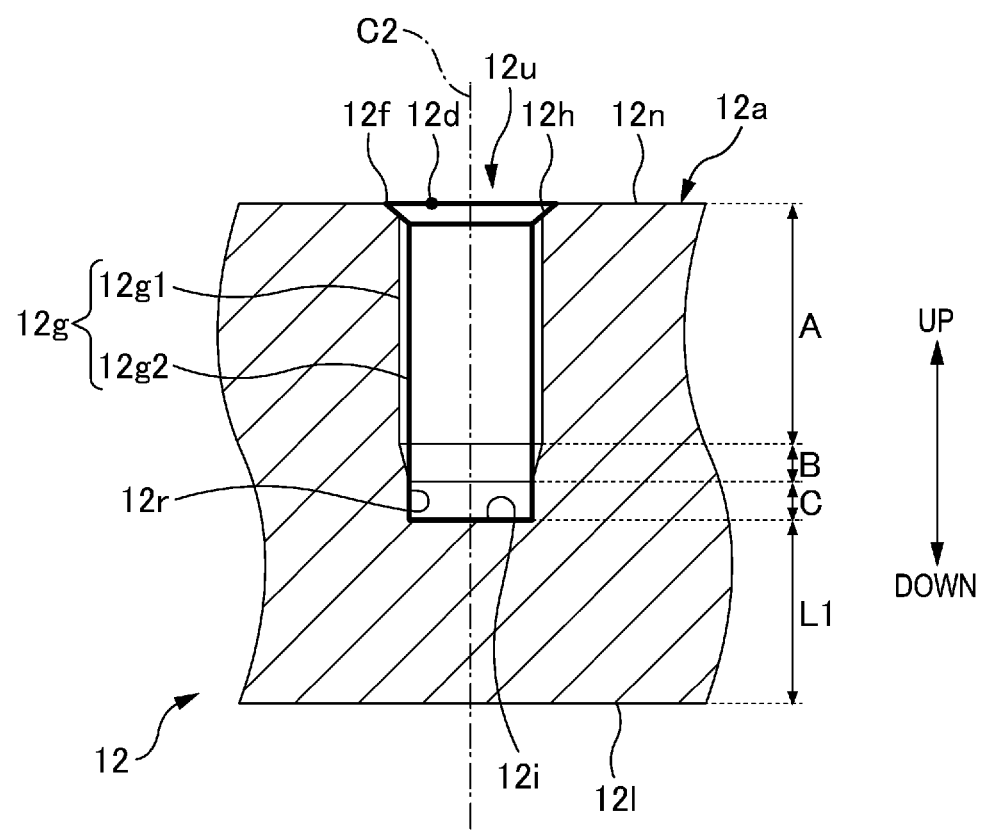
Figure 6A:
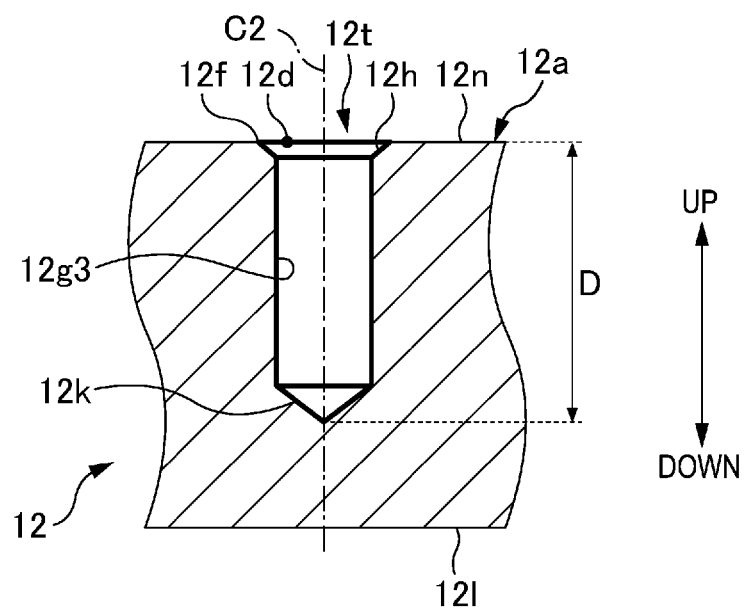
FIGS. 6A, 6B, and 6C are views illustrating another example of a manufacturing method of a screw hole.
Figure 6B:
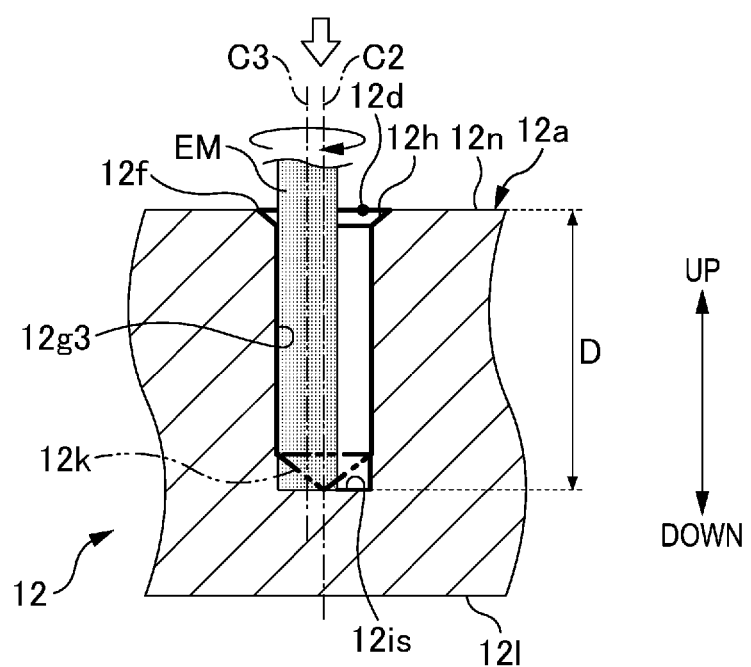
Figure 6C:
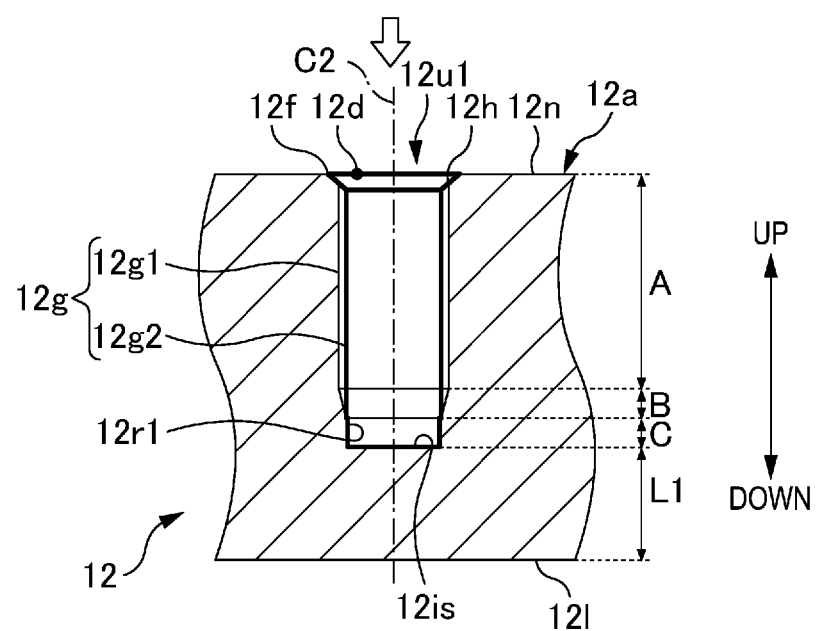
Figure 7:
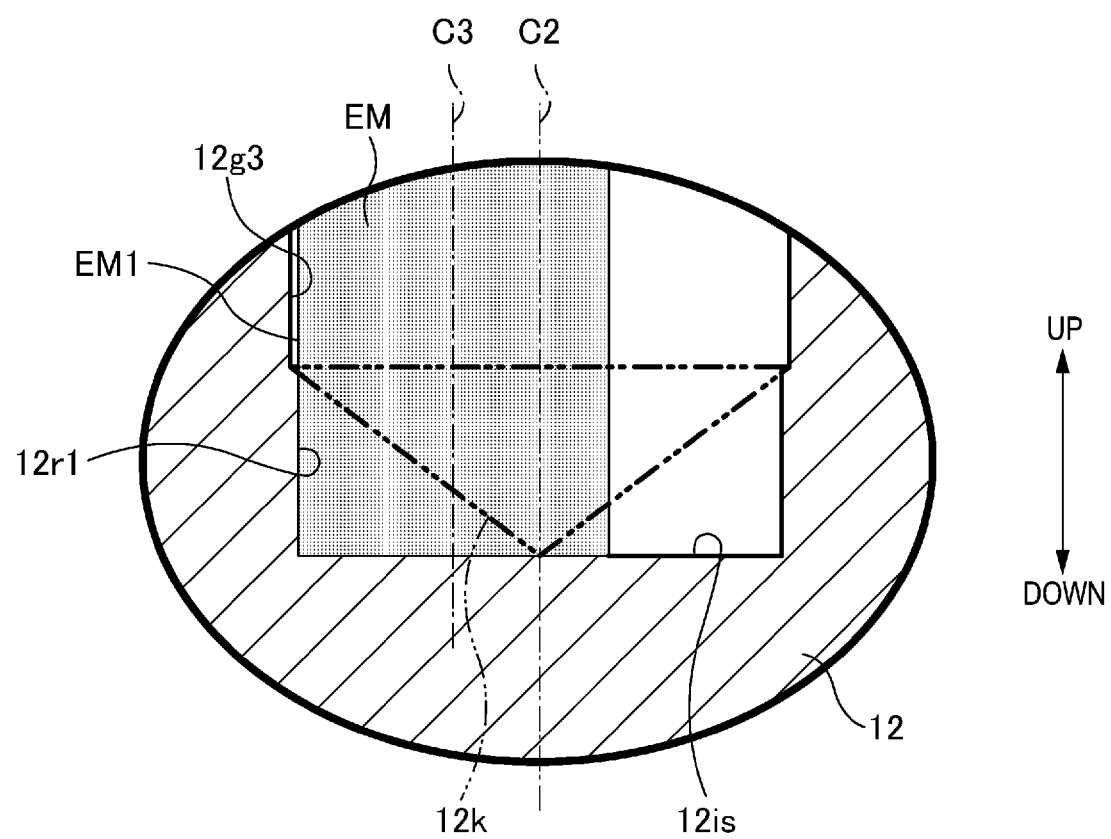
FIG. 7 is a partially enlarged view illustrating a part of FIG. 6B in an enlarged manner.

FIGS. 5A and 5B are views illustrating an example of a manufacturing method of the screw hole 12u. FIG. 5A illustrates a step of forming a pilot hole 12s, and FIG. 5B illustrates a step of forming a female screw at a body wall surface 12g3 of the pilot hole 12s. FIGS. 6A, 6B, and 6C are views illustrating another example of a manufacturing method of a screw hole 12u1. FIG. 6A illustrates a step of forming a pilot hole 12t, FIG. 6B illustrates a step of cutting a tip corner surface 12k of the pilot hole 12t, and FIG. 6C illustrates a step of forming a female screw at a body wall surface 12g3 of the pilot hole 12t. FIG. 7 is a partially enlarged view illustrating a part of FIG. 6B in an enlarged manner.

Die Casting

Molten metal of aluminum is injected into a die casting mold having a cavity corresponding to the shape of the base 12. After the molten metal cools and solidifies in the cavity, the die casting mold is opened to remove a semi-finished product, and a remaining and solidified portion in a runner leading to a gate of the die casting mold is cut. In the present embodiment, a product immediately after die casting is referred to as a semi-finished product, and a product obtained by performing screw hole machining described later on the semi-finished product is referred to as the base 12.

Machining

Next, machining is performed on the semi-finished product immediately after being removed from the die casting mold. In order to facilitate removal of the above-described semi-finished product from the mold, the mold is provided with a so-called draft angle. Therefore, in the semi-finished product, portions to be the side wall inner surface 12m of the base 12 are sometimes provided with an inclination corresponding to the draft angle of the mold. For example, when the above-described inclination is formed at a position opposing the outer peripheral ends of the recording disks 40, the inclination is sometimes machined in order to make the distance between the outer peripheral end and the side wall inner surface 12m uniform. Thus, when the semi-finished product is machined in order to adjust the shape of the portion to be the side wall inner surface 12m, a casting cavity formed inside the semi-finished product is sometimes exposed to the side wall inner surface 12m. Also, in order to adjust the shapes of the surfaces of the base 12, such as the bottom upper surface 12n, the bottom lower surface 12l, and the side wall outer surface 12j, the semi-finished product is sometimes machined. In the case, a casting cavity formed inside the semi-finished product is sometimes exposed at the surfaces of the base 12, such as the bottom upper surface 12n, the bottom lower surface 12l, and the side wall outer surface 12j.

Screw Hole Machining 1

Next, the screw hole 12u for accommodating a male screw is machined in the semi-finished product subjected to the above-described machining. First, the pilot hole 12s as illustrated in FIG. 5A is formed using a drill having a flat-shaped tip. The pilot hole 12s has the opening edge 12f, the tapered surface 12h, the body wall surface 12g3 extending downward from a lower end of the tapered surface 12h, and the tip surface 12i closing a lower side tip of the body wall surface 12g3 and formed flat. The length D in a depth direction of the pilot hole 12s illustrated in FIG. 5A is equal to the length A+B+C of the screw hole 12u illustrated in FIG. 4. Before machining the pilot hole 12s, a rough pilot hole (not illustrated) may be formed by rough machining to have an inside diameter smaller than the inside diameter of the pilot hole 12s.

Next, a screw machining tool (not illustrated) is inserted into the pilot hole 12s and rotated to machine the body wall surface 12g3. Accordingly, as illustrated in FIG. 5B, the inner wall surface 12g having the thread ridge portion 12g2 and the thread valley portion 12g1 is formed. The inner wall end portion surface 12r is a portion of the body wall surface 12g3 formed with neither the thread ridge portion 12g2 nor the thread valley portion 12g1. As a result, the base 12 having the screw hole 12u is formed.

Screw Hole Machining 2

The screw hole 12u1 may be machined by a method different from the above-described screw hole machining 1. First, the pilot hole 12t as illustrated in FIG. 6A is formed using a drill having a tapered tip. The pilot hole 12t has the opening edge 12f, the tapered surface 12h, the body wall surface 12g3 extending downward from a lower end of the tapered surface 12h, and the tip corner surface 12k inclined downward from a lower side tip of the body wall surface 12g3 toward the center axis line C2 of the pilot hole 12t. The length D in a depth direction of the pilot hole 12t illustrated in FIG. 6A is equal to the length A+B+C of the screw hole 12e illustrated in FIG. 4.

Next, the tip corner surface 12k of the pilot hole 12t is cut to form a small-diameter tip surface 12 is as illustrated in FIGS. 6B and 7. Specifically, as illustrated in FIG. 6B, an end mill EM capable of machining the tip corner surface 12k of the pilot hole 12t toward an outer side in the radial direction is inserted to a tip region of the pilot hole 12t. Then, in the tip region of the pilot hole 12t, the end mill EM is moved in the perpendicular direction along the center axis line C2 while being rotated around the center axis line C3 of the end mill EM and revolved around the center axis line C2 of the pilot hole 12t to cut the tip corner surface 12k and obtain the small-diameter tip surface 12 is having a flat surface. When the end mill EM is revolved, the orbit of the end mill EM is set such that an outer peripheral surface EM1 of the end mill EM does not come into contact with the body wall surface 12g3 of the pilot hole 12t (see FIG. 7).

Finally, a screw machining tool (not illustrated) is inserted into the pilot hole 12t and rotated to machine the body wall surface 12g3. Accordingly, as illustrated in FIG. 6C, the inner wall surface 12g having the thread ridge portion 12g2 and the thread valley portion 12g1 is formed. An inner wall end portion surface 12r1 is a portion machined by the end mill EM. As a result, the base 12 having the screw hole 12u1 illustrated in FIG. 6C is formed. The inner wall end portion surface 12r1 of the screw hole 12u1 illustrated in FIG. 6C has an inside diameter slightly smaller than an inside diameter of the inner wall end portion surface 12r of the screw hole 12u illustrated in FIG. 4.

Assembly

Next, the shaft 14, the bearing members 16, the stator core 18, the coil 19, the rotor 20, and the like are assembled to the base 12 prepared as described above to obtain the spindle motor 10.

Operation of Spindle Motor

By causing a current to flow through the coil 19 and switching the polarity, magnetic attractive forces and magnetic repulsion forces generated between the ring magnet 22 and the pole teeth of the stator core 18 are switched. As a result, the rotor 20 rotates about the shaft 14.

When the rotor 20 rotates at a high speed, the lubricant filling the minute clearances between the pair of bearing members 16 and the sleeve 20a is pressurized by dynamic pressure generating grooves (not illustrated). As a result, a dynamic pressure is generated between the pair of bearing members 16 and the sleeve 20a, and due to the generated dynamic pressure, the sleeve 20a rotates while being supported in a non-contact state with respect to the shaft 14. That is, the rotor 20 rotates while being supported in the non-contact state with respect to the shaft 14.

Operation and Effect

Figure 8:
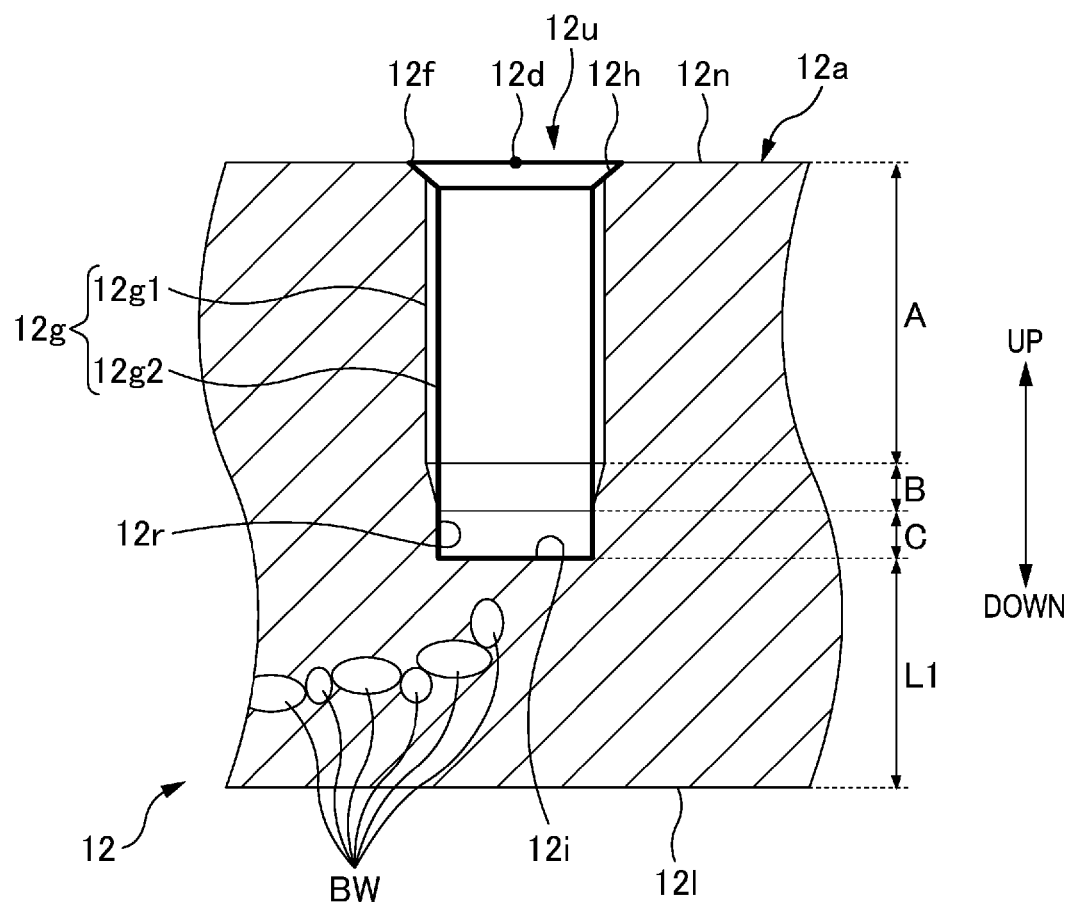
FIG. 8 is a cross-sectional view illustrating an example of a positional relationship among casting cavities formed in the base, a tip surface of the screw hole illustrated in FIG. 4, and a surface of the base.
Figure 9:
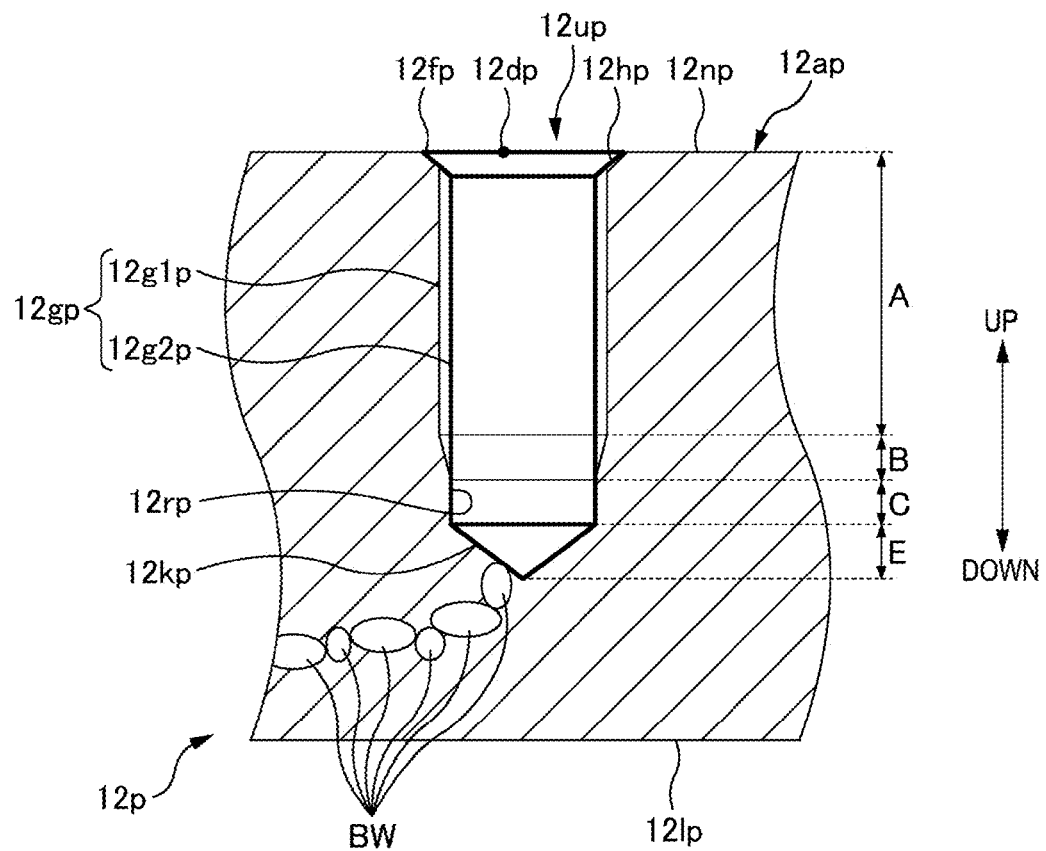
FIG. 9 is a cross-sectional view illustrating an example of a positional relationship among casting cavities formed in a base, a tip corner surface of a screw hole of a conventional spindle motor, and a surface of the base.

Next, operations and effects of the spindle motor 10 and the hard disk drive device 1 according to the present embodiment will be described. FIG. 8 is a cross-sectional view illustrating an example of a positional relationship among casting cavities BW formed in the base 12, the tip surface 12*i* of the screw hole 12*u* illustrated in FIG. 4, and the bottom lower surface 12*l* of the base 12. FIG. 9 is a cross-sectional view illustrating an example of a positional relationship among casting cavities BW formed in a conventional base 12*p*, a tip corner surface 12*kp* of a screw hole 12*up* of a conventional spindle motor, and a bottom lower surface 12*lp* of the base. FIG. 9 illustrates the conventional base 12*p*. Parts having functions same as or similar to functions of the base 12 of the present embodiment are given the same reference signs with the suffix p added. The reference sign E indicated in FIG. 9 is a portion formed corresponding to a tip protruding portion of a drill when machining a pilot hole, and is called a protruding center length. The depth of a screw hole 12*up* of the conventional base 12*p* is longer than the depth of the screw hole 12*e* of the base 12 of the present embodiment by the protruding center length E. Therefore, in the conventional base 12*p*, the tip corner surface 12*kp* easily reaches the casting cavity BW.

In the spindle motor 10 according to the present embodiment, the screw hole 12*u* is a blind hole extending downward from the bottom upper surface 12*n* and having the tip surface 12*i* formed flat. The screw hole 12*v* is a blind hole extending downward from the bottom upper surface 12*n* and having a tip surface formed flat (not illustrated). The screw hole 12*e* is a blind hole extending downward from the side wall upper surface 12*c* and having a tip surface formed flat (not illustrated). Further, other screw holes formed in the base 12 are blind holes extending in a depth direction from the surfaces of the base 12, such as the side wall outer surface 12*j* or the bottom lower surface 12*l*, and having tip surfaces formed flat (not illustrated). Hereinafter, the screw holes formed in the surfaces of the base 12 are sometimes collectively referred to as the screw hole 12*u* and the like, and the tip surfaces of the screw hole 12*u* and the like are sometimes collectively referred to as the tip surface 12*i* and the like.

Thus, in the spindle motor 10 of the present embodiment, since the tip surface 12*i* and the like of the screw hole 12*u* and the like are flat, the depths of the screw hole 12*u* and the like can be reduced by the protruding center length E of the conventional base 12*p*, that is, the thickness of the base 12 can be increased. Therefore, as illustrated in FIG. 8, when the screw hole 12*u* and the like are formed in the base 12, the tip surface 12*i* and the like are less likely to reach the casting cavities BW. Therefore, even when the casting cavities BW are exposed at the surfaces of the base 12 due to machining, cracking, or the like of the surfaces of the base 12, the interior space S1 and the exterior space S2 of the housing 35 are less likely to communicate via the casting cavities BW. Accordingly, entrance of foreign matter from the exterior space S2 to the interior space S1 can be avoided, and leakage of a gas from the interior space S1 to the exterior space S2 can be avoided. Further, since the thickness of the base 12 can be increased by the protruding center length E of the conventional base 12*p*, a rigidity of the base 12 can be enhanced. Therefore, the shaft 14, the stator core 18, and the like fixed to the base 12 are stabilized during the driving of the spindle motor 10.

In the spindle motor 10 according to the present embodiment, the shortest distance L1 between the tip surface 12*i* and the like of the screw hole 12*u* and the like and surfaces of the base 12 facing the tip surface 12*i* and the like is from 0.5 mm to 2.0 mm.

The lower limit value 0.5 mm and the upper limit value 2.0 mm of the above-described shortest distance L1 have been obtained as a result of intensive studies by the present inventors to ensure the rigidity required for the base 12 and to increase the volume of the interior space S1 of the housing 35 as much as possible while maintaining the size of the housing 35. Therefore, when the spindle motor 10 according to the present embodiment is used in the hard disk drive device 1, the shaft 14, the stator core 18, and the like fixed to the base 12 are stabilized during driving of the spindle motor 10. Therefore, vibration, deflection, or the like can be avoided, and the hard disk drive device 1 can thus stably be operated. Moreover, a larger number of the recording disks 40 can be accommodated while avoiding an increase in size of the hard disk drive device 1, and thus it can meet the demand for a higher capacity.

Further, the present inventors have investigated helium leakage in the hard disk drive device 1 filled with helium in the interior space S1, and have found that when there are casting cavities BW around thick portions between the screw holes 12*u* and the like and the surfaces of the base 12 (that is, the bottom lower surface 12*l*, the bottom upper surface 12*n*, the side wall upper surface 12*c*, the side wall outer surface 12*j*, and the side wall inner surface 12*m*), the minute voids are likely to be connected to the surfaces of the base 12, resulting in leakage of helium to the outside. In the spindle motor 10 according to the present embodiment, even when the casting cavities BW are formed in the vicinities of the surfaces of the base 12, and the screw hole 12*u* and the like are formed in the base 12 (for example, FIG. 4), the tip surface 12*i* and the like of the screw hole 12*u* and the like are less likely to reach the casting cavities BW. Therefore, for example, even when minute voids of the casting cavities BW are connected to the surfaces of the base 12 due to machining, cracking, or the like of the surfaces of the base 12 and the casting cavities BW are exposed at the surfaces of the base 12, the interior space S1 and the exterior space S2 of the housing 35 are less likely to communicate via the casting cavities BW. Therefore, entrance of foreign matter from the exterior space S2 to the interior space S1 can be avoided, and leakage of a gas from the interior space S1 to the exterior space S2 can also be avoided.

In the spindle motor 10 according to the present embodiment, the screw hole 12*u* and the like have the inner wall surface 12*g* extending in a depth direction between a surface of the base 12 and the tip surface 12*i* and the like, and the inner wall surface 12*g* is formed with the thread ridge portion 12*g*2 and the thread valley portion 12*g*1 (female screw) to be screwed with a male screw.

When a contact area between the male screw and the inner wall surface 12*g* is increased in order to increase a fastening force by the male screw, the effective screw length A of the screw hole 12*u* and the like often becomes longer than the inside diameter of the inner wall surface 12*g* (inside diameter of the thread ridge portion 12*g*1). When the inner wall surface 12*g* becomes longer in a depth direction, the tip surface 12*i* and the like of the screw hole 12*u* and the like become easier to reach the casting cavities BW. However, with the spindle motor 10 of the present embodiment, even in the case, the tip surface 12*i* and the like of the screw hole 12*u* and the like are less likely to reach the casting cavities BW. Therefore, the interior space S1 and the exterior space S2 of the housing 35 are less likely to communicate via the casting cavities BW, and thus entrance of foreign matter from the exterior space S2 to the interior space S1 can be avoided, and leakage of a gas from the interior space S1 into the exterior space S2 can also be avoided.

The hard disk drive device 1 according to the present embodiment includes the spindle motor 10 described above. The spindle motor 10 has the rotating portion 10*b* configured to rotate with respect to the base 12. A gas (for example, air)

is normally present in the interior space S1 of the housing 35 of the hard disk drive device 1. With the hard disk drive device 1, a screw hole conventionally formed as a blind hole or a portion having a thin thickness of the base 12 can be formed as the screw hole 12u and the like having the tip surface 12i formed flat and the like, and the depths of the screw hole 12u and the like can be reduced compared with the depths in the conventional base 12p. Therefore, in any type of the hard disk drive device 1, not being limited to the model filled with helium, the tip surface 12i and the like of the screw hole 12u and the like are less likely to reach the casting cavities BW. Thus, even when the casting cavities BW are exposed at the surfaces of the base 12 due to machining, cracking, or the like, the interior space S1 and the exterior space S2 of the housing 35 are less likely to communicate via the casting cavities BW. Accordingly, entrance of foreign matter from the exterior space S2 to the interior space S1 can be avoided, and leakage of gas from the interior space S1 to the exterior space S2 can be avoided.

In the hard disk drive device 1 according to the present embodiment, a gas having a density lower than the density of air is contained in the housing 35. In the housing 35, for example, helium is contained as a gas having a density lower than the density of air. Therefore, air resistance due to the rotation of the recording disks 40 is reduced. Thus, the rotation unevenness and vibration of the recording disk 40 are reduced, and the recording disks 40 can be operated with high accuracy. Accordingly, the recording disk 40 can be made thinner, the number of disks can be increased, and the demand for higher capacity can be met. On the other hand, since the gas having a density lower than the density of air has a small atomic size, even with a minute casting cavity BW, the air is highly possible to leak to the exterior space S2 of the housing 35. In the respect, with the hard disk drive device 1 of the present embodiment, since the interior space S1 and the exterior space S2 of the housing 35 are less likely to communicate via the casting cavities BW, leakage of helium can be avoided.

In the hard disk drive device 1 according to the present embodiment, at least seven of the recording disks 40 are provided with predetermined gaps in the axial direction C1 of the shaft 14. In the base 12 of the present embodiment, since the thicknesses between the tip surface 12i and the like of the screw hole 12u and the like and the surfaces of the base 12 (the first surfaces at the housing exterior side and the second surfaces at the housing interior side) facing the tip surface 12i and the like are increased compared with the thicknesses in the conventional base 12p, the rigidity of the base 12 can be increased. Therefore, even when the number of the recording disks 40 is set to seven or more in order to meet the demand for a larger capacity of the hard disk drive device 1, vibration due to the rotation is unlikely to occur, and the accuracy of writing to the recording disks 40 and reading from the recording disks 40 is improved.

In the above-described embodiment, the following aspects are disclosed.

Aspect 1

In the above-described embodiment, a spindle motor 10 is used for a hard disk drive device 1, and includes a base 12 being a cast product as a part of a housing 35 of the hard disk drive device 1. The base 12 includes a screw hole 12u and the like as hole portions configured to accommodate male screws as fastening members configured to fasten a voice coil motor 90 and the like as members to be attached to the base 12. The screw hole 12u and the like are blind holes extending in a depth direction from surfaces of the base 12, that is, first surfaces (side wall upper surface 12c, side wall outer surface 12j, and a bottom lower surface 12l) at a housing exterior side or second surfaces (side wall inner surface 12m and a bottom upper surface 12n) at a housing interior side, and having a tip surface 12i and the like formed flat.

Aspect 2

In Aspect 1, the shortest distance between the tip surface 12i and the like and the surfaces of the base 12 facing the tip surface 12i and the like is from 0.5 mm to 2.0 mm.

Aspect 3

In Aspect 1 or 2, the screw hole 12u and the like include an inner wall surface 12g extending in the depth direction between a surface of the base 12 and the tip surface 12i and the like, the inner wall surface 12g being formed with a female screw to be screwed with a male screw as the fastening member.

Aspect 4

In the above-described embodiment, the hard disk drive device 1 includes: the spindle motor 10 according to any of Aspect 1 to Aspect 3, the spindle motor 10 being accommodated in the housing 35 and including a rotating portion 10b configured to rotate with respect to the base 12; recording disks 40 accommodated in the housing 35 and supported by the rotating portion 10b; magnetic heads 70 accommodated in the housing 35 and configured to perform recording of data on the recording disks 40 and reading of data recorded on the recording disks 40; and a cover 30 forming the housing 35, as a member to be attached.

Aspect 5

In Aspect 4, the housing 35 contains a gas having a density lower than a density of air.

Aspect 6

In Aspect 4 or 5, at least seven of the recording disks 40 are provided with a predetermined gap.

While a preferred embodiment of the disclosure has been described above, the disclosure is not limited to the spindle motor 10 and the hard disk drive device 1 according to the embodiment described above, and includes various aspects included in concepts and claims of the disclosure. Further, the respective configurations may be selectively combined as appropriate so as to achieve the object and the effects described above. For example, a shape, a material, an arrangement, a size, and the like of the respective components in the embodiment described above may be changed as appropriate according to a specific aspect of the disclosure.

For example, the component for fastening the voice coil motor 90, the cover 30, and the like to the base 12 is not limited to a male screw, and may be, for example, a pin (such as a ball lock pin or a parallel pin). In the case, the base 12 may be formed with a blind hole without a thread ridge. Further, the side wall portions 12b need not extend upward from the bottom upper surface 12n of the bottom portion 12a, and may extend upward from side surfaces (not illustrated) of the bottom portion 12a.

The location for performing machining on the semi-finished product immediately after casting is not limited to the side wall inner surface 12m, and the machining may be performed on any part of the surfaces of the base 12. Further, the rotor 20 may be constituted of the hub 20b integrated with the sleeve 20a.

In the above-described present embodiment, an example of the spindle motor 10 provided with the shaft 14 and the columnar support 52 as components separate from the base 12 has been described. However, at least one of the shaft 14 and the columnar support 52 may be die cast integrally with the base 12 as a component of the base 12. That is, the spindle motor may be configured by forming screw holes in the upper side end portion of the shaft portion and the upper side end portion of the columnar support portion as components of the base. The screw holes are blind holes extending downward (depth direction) from the upper surface of the shaft portion and the upper surface of the columnar support portion (the first surfaces at the housing exterior side) and having tip surfaces formed flat.

In the above-described embodiment, an example of the spindle motor 10 provided with the shaft 14 as a component of the stationary portion 10a has been described. That is, an example of the shaft 14 being fixed to the base 12 by press fitting or the like, and the pair of bearing members 16 being fixed to an outer peripheral surface of the shaft 14 has been described. However, the spindle motor may have a shaft as a component of the rotating portion 10b. That is, the spindle motor may be configured by fixing a bearing sleeve (not illustrated) to a base and fixing a rotor to an outer peripheral surface of a shaft rotatably supported by the bearing sleeve.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A spindle motor for use in a hard disk drive device, comprising
 a base being a cast product as a part of a housing of the hard disk drive device, wherein
 the base includes a hole portion configured to accommodate a fastening member configured to fasten a member to be attached to the base, and
 the hole portion is a blind hole extending in a depth direction from a surface of the base and having a tip surface formed flat, and has a pilot hole depth which is obtained by adding an effective screw length, an incomplete screw length, and a margin length in the depth direction from the surface of the base, and
 the margin length is corresponding to less than 0.5 pitches of the effective screw length.

2. The spindle motor according to claim 1, wherein
 a shortest distance between the tip surface and a bottom lower surface of the base facing the tip surface is from 0.5 mm to 2.0 mm.

3. The spindle motor according to claim 1, wherein
 the hole portion includes an inner wall surface extending in the depth direction between the surface of the base and the tip surface, the inner wall surface being formed with a female screw to be screwed with a male screw as the fastening member.

4. A hard disk drive device comprising:
 the spindle motor according to claim 1, the spindle motor being accommodated in the housing and including a rotating portion configured to rotate with respect to the base;
 a recording disk accommodated in the housing and supported by the rotating portion;
 a magnetic head accommodated in the housing and configured to perform recording of data on the recording disk and reading of data recorded on the recording disk; and
 a cover forming the housing, as the member to be attached.

5. The hard disk drive device according to claim 4, wherein
 the housing contains a gas having a density lower than a density of air.

6. The hard disk drive device according to claim 4, comprising a plurality of recording disks accommodated in the housing and supported by the rotating portion, wherein at least seven of the plurality of recording disks are provided with a predetermined gap.

* * * * *